United States Patent
Adams et al.

(10) Patent No.: US 7,289,085 B2
(45) Date of Patent: Oct. 30, 2007

(54) COMBINED INSTRUMENT AND STRUCTURE PROVIDED WITH A COMBINED INSTRUMENT

(75) Inventors: Juergen Adams, Villingen-Schwenningen (DE); Thomas Schlageter, Furtwangen (DE); Juergen Wolf, Villingen-Schwenningen (DE)

(73) Assignee: Siemens AG, München ( * ) Notice: Subject to any disclaimer, the term of this patent is extended or adjusted under 35 U.S.C. 154(b) by 445 days.

(21) Appl. No.: 10/942,882

(22) Filed: Sep. 17, 2004

(65) Prior Publication Data

US 2005/0057351 A1    Mar. 17, 2005

Related U.S. Application Data

(63) Continuation of application No. PCT/DE03/00910, filed on Mar. 19, 2003.

(30) Foreign Application Priority Data

Mar. 28, 2002 (DE) .............................. 102 14 200

(51) Int. Cl.
 *G09G 5/00* (2006.01)
(52) U.S. Cl. .......................................... 345/7; 345/1.1
(58) Field of Classification Search ................ 345/1.1, 345/1.2, 1.3, 156, 177, 4, 7, 8, 204; 340/438, 340/440, 465, 466
 See application file for complete search history.

(56) References Cited

U.S. PATENT DOCUMENTS

| 4,831,366 A | 5/1989 | Iino |
| 5,296,868 A | 3/1994 | Itami et al. |
| 5,386,216 A | 1/1995 | Iino |

FOREIGN PATENT DOCUMENTS

| DE | 19852873 A1 | 5/2000 |
| DE | 19948491 A1 | 4/2001 |
| JP | 2003-252127 | * 11/2002 |
| WO | WO97/31803 | 9/1997 |

OTHER PUBLICATIONS

Derwent Abstract—DE-19852873A1; May 25, 2000; TRW Automotive Electronics & Components GmbH & Co. KG, D-78315 Radolfzell (Germany).
Derwent-Abstract—DE19948491AQ1; Apr. 12, 2001; Mannesmann VDO AG, 60388 Frankfurt (Germany).

* cited by examiner

*Primary Examiner*—Nitin I. Patel

(57) ABSTRACT

The invention relates to a combined instrument display device for installation in a motor vehicle, and a drive device with which the position of the display device relative to the vehicle can be modified so as to allow for glare-free reading. The position of the display device is modified automatically by an installed electronic circuit that controls the drive device subject to defined parameters. The parameters may be measuring values of light sensors and/or motion sensors mounted on the vehicle and/or values that are determined by an evaluation unit using a database.

17 Claims, 3 Drawing Sheets

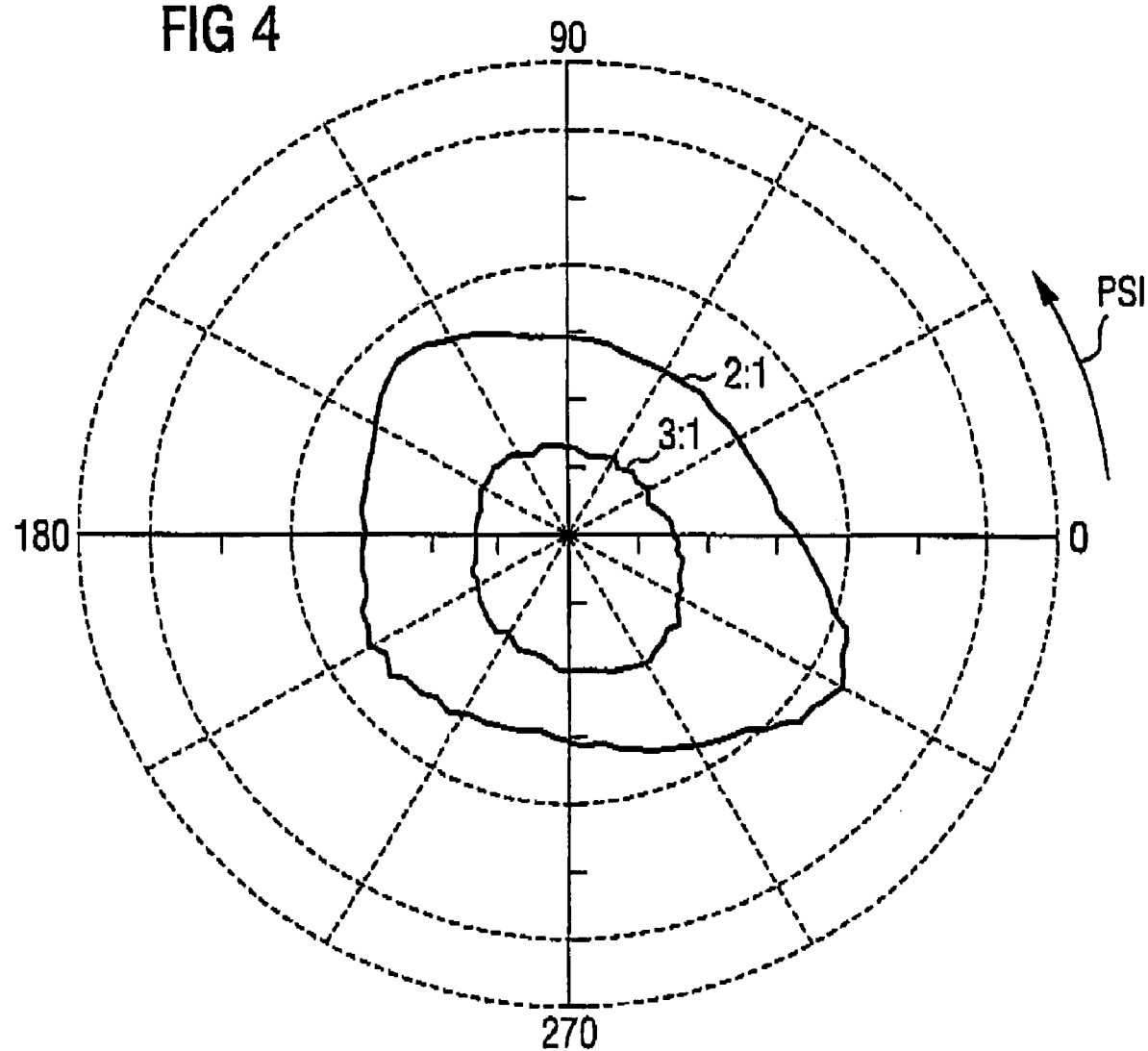

COMBINED INSTRUMENT AND STRUCTURE PROVIDED WITH A COMBINED INSTRUMENT

The present invention relates to a combined instrument for installation in the dashboard of a vehicle, and to an arrangement having such a combined instrument.

Combined instruments which are mounted in the field of vision of the driver in the dashboard of a vehicle generally contain not only a speedometer, rev counter or the like but also monitoring lamps and other display instruments. These are exclusively visual displays which are usually provided with a shade in order to improve the contrast effect and legibility of the display even under unfavorable external light conditions. Such anti-dazzle devices are however only suitable for shielding to a somewhat adequate degree light incident from specific directions.

DE 199 48 491 A1 describes a combined instrument in which, in order to improve the legibility of the display unit arranged therein, the possibility is provided of pivoting the instrument or parts thereof through at least one spatial axis. The entire combined instrument or individual display units are mounted for this purpose in a movable fashion in the dashboard or in a housing. In order to pivot or tilt the combined instrument it is possible to install specially provided actuating motors which are controlled by operator control elements which are suitably mounted and have to be activated by the driver.

A disadvantage with such a system is that the driver himself must activate operator control elements in order to set the display in the combined instrument so that it is free of dazzle and has a high level of contrast. The pivoting of the combined instrument when dazzle effects occur can take several seconds. If a suitable position is not found immediately, the process of orienting the combined instrument has to be repeated. The setting and adjustment of the combined instrument is therefore associated with a certain degree of effort which additionally requires the attention of the driver while traveling and therefore constitutes a safety risk.

The object of the present invention is to specify how a dazzle effect as a result of external light can be avoided with a combined instrument without the operation of the vehicle becoming more complicated and additional effort being required of the driver.

This object is achieved by means of the combined instrument having the features of claim 1 and by means of the arrangement of a combined instrument having the features of claim 7. Embodiments can be found in the dependent claims.

The combined instrument has the drive device with which the position of an visual display device which is present in the combined instrument can be varied with respect to the vehicle. This is carried out automatically by means of an installed electronic circuit which controls the drive device as a function of one or more input parameter values. These parameter values can be determined on the basis of different measured values, or can be determined from the values stored in a database, if appropriate in conjunction with measured values, in an evaluation unit which is associated with the electronic circuit. Such an evaluation unit is provided for processing one or more input parameter values in order to obtain one or more parameter values for controlling the drive device.

The position of the display device can be changed by pivoting the combined instrument in its entirety, or only parts of the combined instrument with display devices installed therein, or the housings or chassis of individual display devices or groups of display devices are pivoted. This is referred to below in each case as a change in the position of the display device, for the sake of simplicity.

In preferred embodiments of the combined instrument or of an arrangement with the combined instrument at least one light sensor is present with which the external light conditions are detected and a possibly occurring dazzle effect is thus detected. A plurality of light sensors may be provided in or on the vehicle or directly in the combined instrument, in particular a four-quadrant light sensor, in order to detect in this way the direction of incident interference light and change the position of the display device in such a way that the combined instrument or parts of the combined instrument can be pivoted in such a way that the dazzle is eliminated entirely or at least partially.

There follows a more precise description of examples of the combined instrument and embodiments thereof as well as arrangements with such a combined instrument, by reference to FIGS. 1 to 4.

FIG. 4 shows an iso-contrast diagram.

Figure 1:
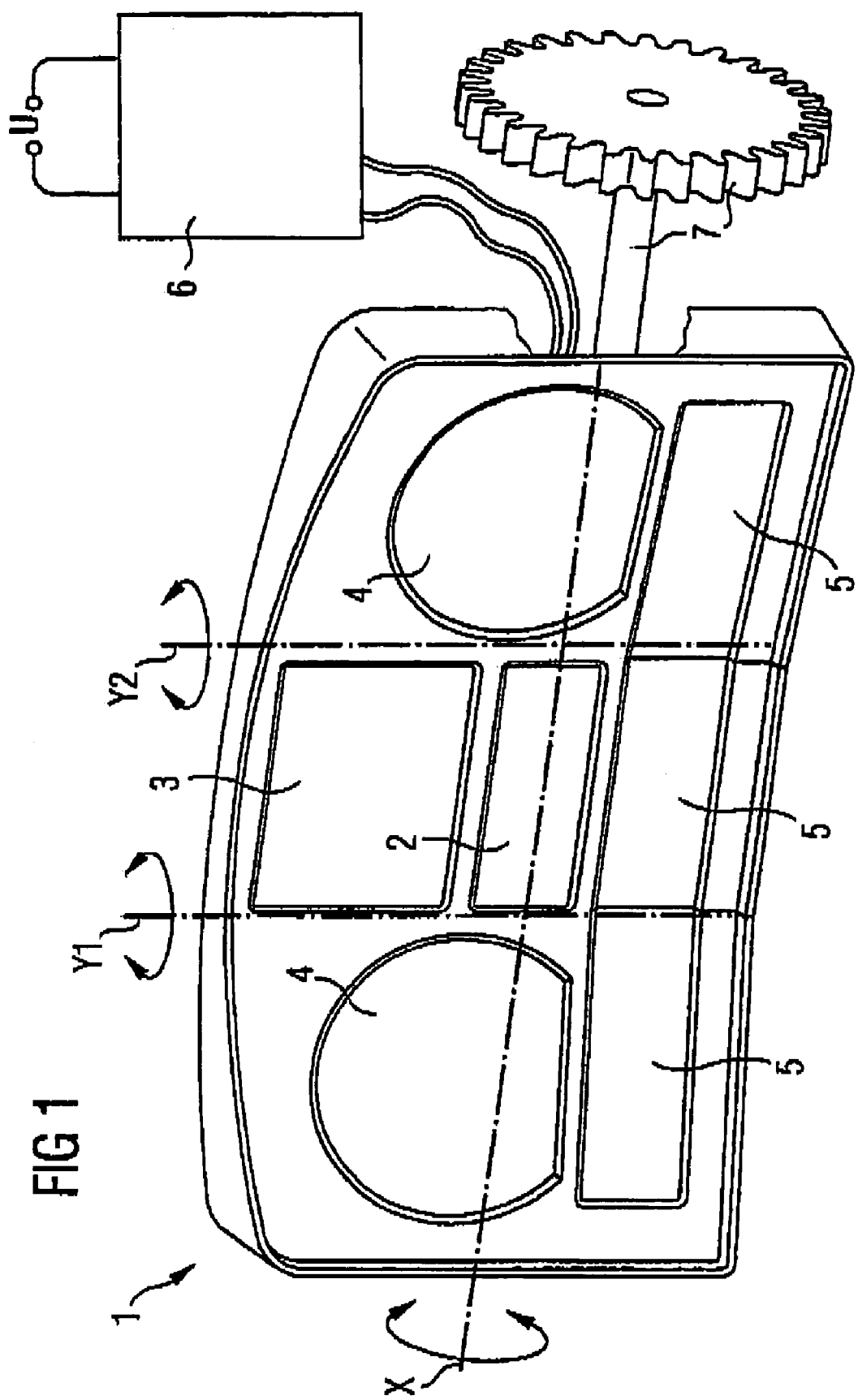
FIG. 1 shows a schematic view of an exemplary embodiment of a combined instrument according to the invention.

FIG. 1 shows a combined instrument in which a plurality of visual displays are provided in a housing 1. This combined instrument can be installed in the dashboard of a vehicle. In the combined instrument illustrated as an example in FIG. 1, a light sensor 2, a four-quadrant light sensor 3, analog display units 4 and monitoring lights 5 are installed on the front side. The combined instrument can be inclined about a horizontal axis X; the side parts which are present on the left and right can each be pivoted about a vertical axis Y1, Y2. An electronic circuit 6, for example in the form of a semiconductor chip, with which the drive device 7 is controlled, is installed in the combined instrument. The drive device 7 can in principle be of any desired design, preferably with actuating motors. In the example illustrated in FIG. 1, a gearwheel is shown only schematically in order to indicate here an actuating motor drive for the pivoting about the horizontal axis X. The precise embodiment of the movable bearing of the combined instrument in the dashboard and the embodiment of the drive device are within the discretion of the person skilled in the art or can be selected in accordance with the circumstances and require only the means which are known per se from the specialist field of servocontrol.

In one particularly preferred exemplary embodiment of an automatic adjustment of the display device of a combined instrument, essentially five parts are present: 1. the housing with the visual display instruments provided thereon, 2. at least one light sensor, 3. an electronic circuit with a processing unit and a control unit, 4. actuator elements and 5. a sensor system which detects changes in direction of the vehicle. The design of such a system for changing the position of the display device is presented below with reference to its functional principle.

The adjustment system is activated if an interference light source becomes perceptible. Such a source of interference light may be, for example, the sun whose radiation shines through the windows onto the dashboard and the visual display of the combined instrument. As a result, the contrast of the visual display is reduced; the driver may also be dazzled. A light-sensitive sensor system detects the occurrence of the interference light. For this purpose, at least one light sensor 2, with which the intensity of the incident radiation is measured, is present. There may also be an arrangement of light sensors with which the angle of incidence of the interference radiation can also be detected, for example with the four-quadrant light sensor 3.

In addition, navigation data of the vehicle may also be determined, said data including, in particular: coordinates indicating the instantaneous position of the vehicle in a reference system which is fixed to the earth or with respect to a predefined route, direction coordinates and the absolute value of the velocity in order to indicate the velocity of the vehicle, the angle of inclination of the vehicle with respect to the horizontal plane, the frequency and degree of the changes in the direction of travel, if appropriate satellite navigation data, the time and the current route information from a route planner or road atlas.

In order to prevent the automatic change in the position of the display device giving rise to exaggerated and excessively frequent movements of the display device, the sensor system for detecting the changes in direction of the vehicle is preferably used to determine whether at that moment the driver is driving relatively steadily or carrying out only slight steering movements or whether the direction of the vehicle repeatedly changes significantly within a short time. In one driving mode with slight changes in direction, it is expedient to pivot the display device into a dazzle-free position. When there are brief continuous changes in direction it is assumed that a dazzle effect due to interference light occurs only temporarily and consequently continuous readjustment of the position of the display device would be superfluous and in fact felt to be disruptive.

The drive device of the combined instrument is controlled automatically by an evaluation unit or a processing unit, which evaluates the measured values of the light sensors and/or of the movement sensors, but at the same time can also take into account parameters which depend on the optical properties of the display devices themselves, for example an angle-dependent degree of contrast, in such a way that the position of the display device is changed to match the current light conditions. This adjustment is carried out until the dazzle effect is eliminated or the contrast has at least been improved.

The number and orientation of the axes about which the combined instrument or parts of the combined instrument can be rotated can in principle be freely selected. On an individual case basis it may be sufficient if the combined instrument can be inclined forward about an axis, for example the horizontal axis X in FIG. 1 which can however also be oriented somewhat obliquely with respect to the horizontal. A suitable selection of the precise embodiments is made by a person skilled in the art since on an individual case basis the dazzle effects which occur depend on the reflective surfaces of the vehicle and the quality of the windows.

Figure 2:
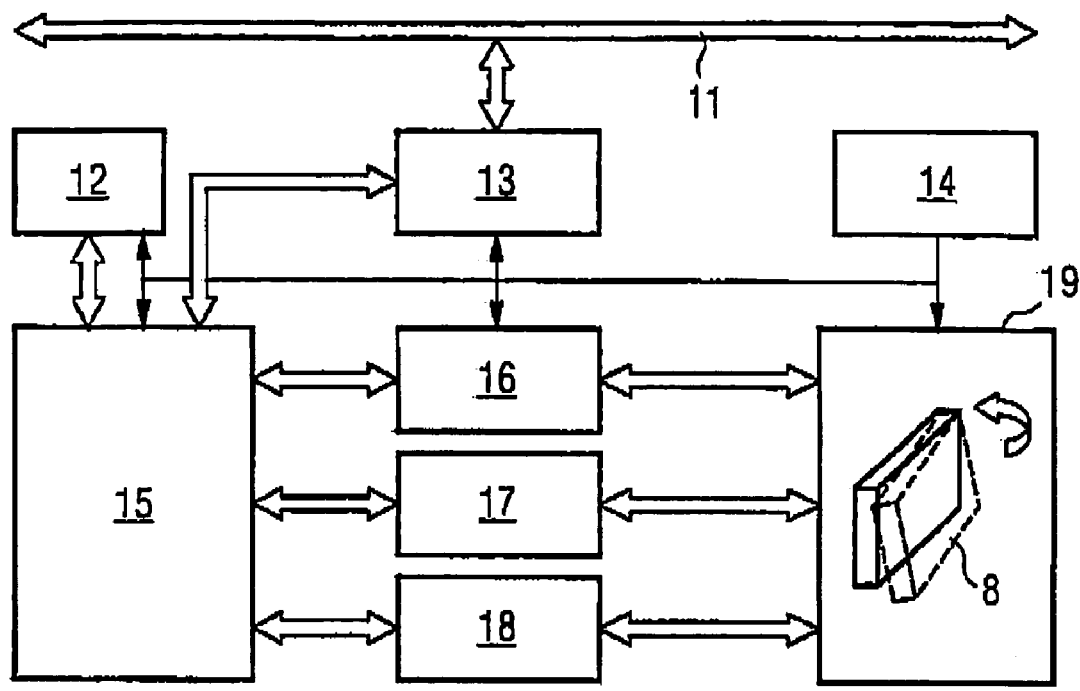
FIG. 2 shows a basic diagram of a suitable system for actuating the combined instrument for automatic adjustment.

FIG. 2 is a basic diagram relating to the actuation of the drive device in order to change the position of the display device. The upper double arrow signifies therein the transmission of information in a network 11 (for example X line, CAN, MOST [Media Oriented System Transport]) in which all the necessary data records, such as the brightness of the interference light, a correction which is adapted to the sensitivity with the eye, an incident angle of the radiation, the steering movement, the method of visual display and navigation data or position data is transmitted. The repeater 13 receives the data from the network and makes it available to the programmable processing module 15. The processing module 15 makes the information available using the memory 12. The memory 12 contains all the parameters and data (for example data of an iso-contrast diagram, the type of reflection of the display device and the like) which are necessary to adjust the combined instrument and to change the position of the display device.

The processing module 15 communicates with a series of drivers, in this example a first driver 16 for the light sensor or a CCD camera, a second driver 17 for the actuating motors of the drive device and a third driver 18 for a background illumination of the display device. The first driver 16 transmits the measurement data of the light intensity and of the angle of incidence of the interference light which the light sensor or the CCD camera detects. The second driver 17 makes position control of the display device of the combined instrument possible. The third driver 18 controls the background illumination or frontal illumination, depending on the configuration of the display devices.

The arrangement 19, which comprises here the combined instrument with the visual display devices, the drive device and the sensor system, is connected in this way to electronic circuits so that the position of the visual display device 8 can be changed automatically depending on requirements. The drivers preferably operate bidirectionally so that, for example, the parameters which are set or even the set of rules can be checked, in particular in the case of actuating motors. The voltages which are necessary to carry out the adjustment of the combined instrument are transmitted and are conditioned by means of an on-board voltage module 14 from the on-board voltage network of the vehicle. While information transmissions are respectively illustrated with contoured double arrows (not filled in) in the basic diagram in FIG. 2, the voltage supply of the component is illustrated with the single line which starts from the on-board voltage module 14 and branches into arrows.

The freedom from dazzle and the contrast display device are already improved by a slight rotation or inclination of the combined instrument with respect to the device from which the interference light is incident. This is explained with reference to FIG. 3 in which a typical beam path between an interference light source and the driver is indicated. Here, a visual display device 8, the face 9 of the driver and the sun 10 as an interference light source are illustrated. The sunlight is reflected by the display into the driver's eye.

The preferred direction of rotation of the combined instrument is dependent on the type of visual display device used therein. A distinction is made between reflective displays, in which light must strike the front side for them to be read, and transmitted displays, in which the display elements are illuminated from behind and a background illumination is usually provided. A diffuse reflection of the light which is incident on the display produces a considerable amount of scattered light or secondary light, which has to be suitably eliminated when the position of the display device is changed. When interference light with a considerably diffusely reflective component is incident, the display device is preferably rotated out of the direction of the incident light. The angle of incidence of the light with respect to the perpendicular to the reflective surface of the display is increased in this way and the different directions of the reflected light are effectively rotated out of the field of vision of the driver.

What are referred to as transflexive displays are transmissive displays in which a background which reflects the light which is incident from the front is present, and the background can additionally be provided with its own illumination. The visual display elements form a darker contrast against the reflective and possibly self-illuminating, brighter background.

When interference light occurs, such transflexive display devices are preferably rotated toward the interference light source in such a way that the interference light is incident on the reflective background of the display at a steeper angle, that is to say at a smaller angle of incidence with respect to the perpendicular. This has the advantage that in this way the interference light additionally illuminates the background of the display. The emission of light per unit area of the background of the display can thus be increased and the electrical power of the installed background illumination can correspondingly be decreased, as a result of which the service life of the respective illumination device can be extended and energy can be saved.

Figure 3:
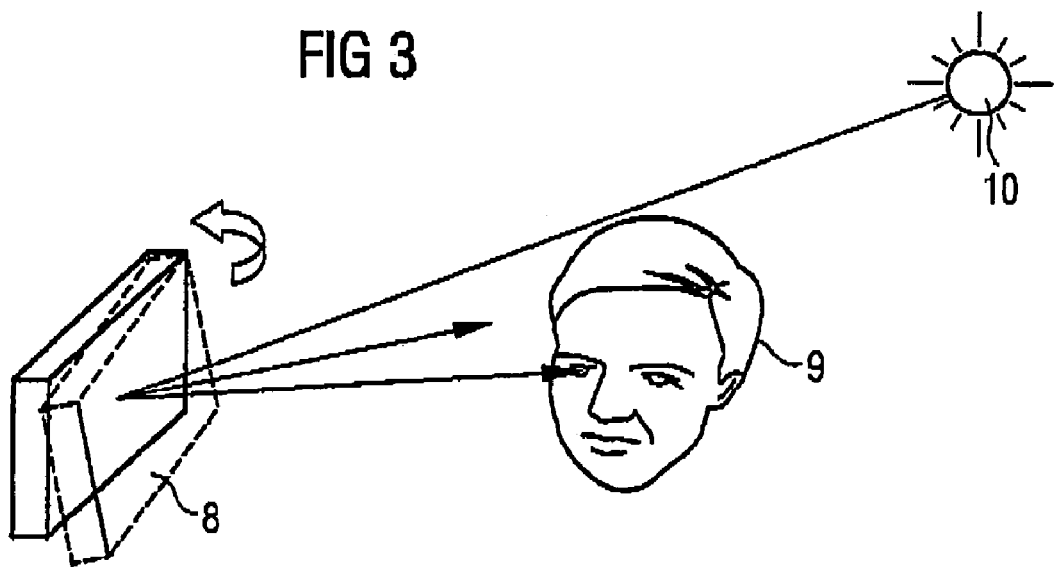
FIG. 3 shows a typical beam path between an interference light source and the driver.

FIG. 3 illustrates the example of a transflexive display device 8 which has an at least partially reflective background and which is rotated in the direction of the indicated arrow when interference light occurs (emitted in this case by the sun 10), said rotation being carried out in such a way that the angle between the direction of the incident light and the direction of the reflected light is decreased. The automatic change in the position of the display device when an interference light source occurs is therefore always carried out here in such a way that the angle between a direction from which light is incident from the interference light source, and the preferred direction which is provided for reading the display is decreased. At the same time, the electrical power of the installed background illumination is decreased. A significant improvement in the contrast is generally obtained as soon as the display is adjusted or readjusted by only a few degrees of angle.

A light sensor which can be used in the arrangement with the combined instrument is composed, in the simplest case, of an individual light-sensitive element which can be installed directly in the combined instrument, for example in the manner of the light sensor 2 in FIG. 1. The light sensor can however also be provided at other locations in the vehicle or on the vehicle. By means of the light sensor it is possible, for example, to measure directly the actually present intensity of the solar radiation which is possibly screened by clouds or parts of vehicles.

An evaluation unit can calculate the position of the sun relative to the instantaneous orientation of the vehicle from data relating to the position of the vehicle and from the current time. By taking into account the measured light intensity, the position of the display device is maintained or suitably changed.

Less computing power in the evaluation unit requires the use of a multicomponent light sensor, in particular a four-quadrant light sensor 3, such as is shown in FIG. 1 as an example on the front side of the combination instrument 1. This is a light sensor which is divided into four separate regions, or an arrangement of four separate light sensors according to the quadrants of a two-dimensional Cartesian coordinate system. A four-quadrant light sensor permits the light intensity and the direction of incidence of an interference beam to be calculated in an analog fashion by means of suitable amplifier elements (divider, adder, etc.). There is no need to input position parameters into the calculations separately.

More detailed information about the position and the intensity of one or more interference light sensors can be acquired by using a CCD camera with evaluation logic and corresponding optics. With such an equipment it is possible to detect the system in terms of position, interference sources and the type of reflection even if the influence of the interference sources is only relatively slight. In addition, the respective degree of interference coming from a plurality of different interference sources can be determined so that the change in the position of the display device can be matched to the position and direction of the light source which is providing most interference. A white T shirt of the driver which is disruptive at night can be recognized as such and the display device can be oriented accordingly.

A particularly suitable embodiment of the evaluation device which is provided for the electronic circuit can be obtained by equipping the evaluation unit with what is referred to as a teach-in module. Such a teach-in module is able to load and evaluate specific parameters which are decisive for the optical state of the display device, so that these parameters which influence the system can be correspondingly taken into account in the adjustment of the display device of the combined instrument as teach-in parameters. In particular the following parameters are suitable as teach-in parameters: significant data from an iso-contrast diagram such as is illustrated as an example in FIG. 4, the type of the display device (reflexive, transmissive, transflexive), the type of the reflector (in particular presence of background illumination) and the maximum and minimum intensity as well as the color of the light of a background illumination which is present. The degree of antireflection as a function of the wavelength of the light, which effect is brought about, for example, by a transparent cover on the combined instrument with an antireflective coating applied to it, can also be taken into account here.

The actuator elements for adjusting the combined instrument are in the simplest case commercially available stepping motors which are provided with suitable drivers and rotate the combined instrument with angular accuracy. As a rule, the motors are mounted on the chassis or housing of the combined instrument so that the display device, the drive device and the electronic circuit are integrated in a modular design. Depending on the embodiment it may be sufficient if only a part of the combined instrument is rotated, in particular, individual display devices with small dimensions can also be arranged so as to be independently movable in the housing so that their position or orientation can also be adjusted by means of electromagnetic or piezo-electrical actuating elements. In a way which is similar to the design of a dynamic loudspeaker, the display is mounted in this case on a (plunger-type) coil or a piezo-crystal. Such actuator elements have a particular advantage that permanent adjustment of the display device is possible (almost) without the time delay ("lag").

So that intrusive and possibly irritating movements of the combined instrument or of individual display devices with large adjustment angles are not carried out continuously, it is preferably always checked whether the vehicle is to some degree maintaining its direction in a constant way. If a satellite navigation system is integrated into the information system of the vehicle, it is instead also possible for the instantaneous position of the vehicle on the actual route to be determined or compared with a route which is programmed in by the driver so that the adjustment of the display device of the combined instrument can be controlled largely free of interference and effectively on the basis of a calculation which is carried out by the evaluation unit.

The combined instrument and the arrangement of the combined instrument with a light sensor and/or a movement sensor forms an automated system for improving the legibility of the displays, with which in particular the service life of CCFL-backlit displays can be lengthened. The position of the entire combined instrument can be changed; it is however also possible to configure the combined instrument in such a way that only parts of it, or the display devices which are inserted into it themselves, are pivoted. Instead of the better contrast which is achieved in this way, the basic brightness of the display instrument which is generated by an installed illumination device can be given a lower setting and as a result the service life of the illumination device is lengthened.

A significant advantage of changing the position automatically or of adjusting the display device automatically is that the driver does not also have to additionally activate operator control elements to control the drive device while driving and at the same time also monitor the correct, that is to say dazzle-free, position of the display device by looking at the combined instrument. When determining the respective optimum position of the display devices it is also possible to include angle-dependent contrast properties in the calculation. The electronic circuit can be provided for changing the position of the display device only if changes in the direction of travel have remained, in terms of frequency and degree, below a predefined value during a predefined time interval.

In addition to the automatic control, means can also be provided which permit the driver to set the position of the combined instrument manually, in particularly the automatic adjustment can be embodied so as to be capable of being switched off. In addition to the influence of interference light sources it is also possible generally to include the reflective properties of the combined instrument and of the interior of the vehicle in the calculation of the adjustment of the combined instrument or of the display devices.

The invention claimed is:

1. A combined instrument for a vehicle, comprising:
   at least one visual display device arranged in a position changeable with respect to the vehicle,
   a drive device coupled to the at least one visual display device so as to effect a change in position, and
   an electronic circuit coupled to the drive device so as to drive the drive device, automatically as a function of one or more input parameter values thereby facilitating human readability of the display device, wherein the electronic circuit comprises an evaluation unit comprising means for processing one or more input parameter values in order to obtain one or more parameter values for controlling the drive device, wherein the electronic circuit is configured to evaluate one or more input parameter values from a group comprising:
   direction coordinates of an interference light source,
   angles between a direction of an interference light source and at least one reference direction,
   instantaneous position of the vehicle,
   angle of inclination of the vehicle,
   direction and/or absolute value of a speed of the vehicle,
   degree and/or frequency of change of a direction of travel,
   satellite navigation data,
   time, and
   information from a route planner or route atlas.

2. The combined instrument according to claim 1, wherein the drive device comprises means for rotating the display device about an axis which is fixed with respect to the vehicle.

3. The combined instrument according to claim 1, wherein the electronic circuit comprises means for evaluating a measured value of a light intensity.

4. The combined instrument according to claim 1, wherein the evaluation unit comprises a teach-in module comprising means for feeding in parameters and data of the display device from a group comprising at least one of: contrast data, dependence of an optical property on a spatial angle, degree of elimination of reflection as a function of wavelength, maximum and minimum intensity of background lighting of the display device, and color of background illumination of the display device, into the evaluation unit in a format which can be processed by the evaluation unit.

5. The combined instrument according to claim 1, further comprising at least one sensor for sensing a vehicle position and/or external light conditions, wherein the sensor is provided in or on the vehicle or in the combined instrument.

6. The combined instrument according to claim 5, further comprising a sensor system for detecting a respective direction of travel, and the electronic circuit further comprises means for changing the position of the display device only if changes in a direction of travel have stayed, in terms of frequency and degree, below a predefined value during a predefined time interval.

7. The combined instrument according to claim 6, further comprising a light sensor comprising means for detecting an interference light source which makes it more difficult to read the display device.

8. The combined instrument according to claim 5, further comprising a light sensor comprising means for detecting an interference light source which makes it more difficult to read the display device.

9. The combined instrument according to claim 8, wherein the light sensor is one of a multicomponent light sensor, a four-quadrant light sensor and a CCD camera.

10. The combined instrument according to 9, wherein each automatic change in the position of the display device increases a reflection angle of a light beam produced by an interference light source.

11. The combined instrument according to claim 8, wherein each automatic change in a position of the display device increases a reflection angle of a light beam produced by an interference light source.

12. The combined instrument according to claim 8, wherein the display device further comprises means for reading in a preferred direction by means of light passing through from a background illumination, the display device further having an at least partially reflective background; and each automatic change in the position of the display device taking place when an interference light source occurs, in such a way that an angle between a direction from which light from the interference light source is incident and the preferred direction which is provided for reading is decreased.

13. The combined instrument according to claim 9, wherein the display device further comprises means for reading in a preferred direction by means of light passing through from a background illumination, the display device further having an at least partially reflective background; and each automatic change in the position of the display device taking place when an interference light source occurs, in such a way that the angle between a direction from which light from the interference light source is incident and the preferred direction which is provided for reading is decreased.

14. The combined instrument according to claim 1, wherein the drive device comprises means for rotating the display device about two axes which are fixed with respect to the vehicle and are not parallel to one another.

15. The combined instrument according to claim 1, wherein the evaluation unit comprises a teach-in module comprising means for feeding in parameters and data of the display device from a group comprising at least one of: is contrast data, dependence of an optical property on a spatial angle, degree of elimination of reflection as a function of wavelength, maximum and minimum intensity of background lighting of the display device, and color of background illumination of the display device, into the evaluation unit in a format which can be processed by the evaluation unit.

16. A combined instrument for a vehicle, comprising:
at least one visual display device arranged in a position changeable with respect to the vehicle;
a drive device coupled to the at least one visual display device so as to effect a change in position;
an electronic circuit coupled to the drive device so as to drive the drive device, automatically as a function of one or more input parameter values thereby facilitating human readability of the display device;
at least one sensor for sensing at least one of a vehicle position and external light conditions, wherein the sensor is provided in or on the vehicle or in the combined instrument; and
a sensor system for detecting a respective direction of travel, wherein the electronic circuit further comprises means for changing the position of the display device only if changes in a direction of travel have stayed, in terms of frequency and degree, below a predefined value during a predefined time interval.

17. A combined instrument for a vehicle, comprising:
at least one visual display device arranged in a position changeable with respect to the vehicle;
a drive device coupled to the at least one visual display device so as to effect a change in position;
an electronic circuit coupled to the drive device so as to drive the drive device, automatically as a function of one or more input parameter values thereby facilitating human readability of the display device;
at least one sensor for sensing at least one of a vehicle position and external light conditions, wherein the sensor is provided in or on the vehicle or in the combined instrument; and
a light sensor comprising means for detecting an interference light source which makes it more difficult to read the display device.

* * * * *